United States Patent Office 2,977,233
Patented Mar. 28, 1961

2,977,233

METHOD FOR THE PRODUCTION OF SAUSAGE SKINS

Hubert Jacob Vaessen, Deventer, Netherlands, assignor to Vasco Industries Corporation, New York, N.Y., a corporation of the United States of America No Drawing. Filed June 17, 1958, Ser. No. 742,469

Claims priority, application Netherlands Oct. 17, 1957

3 Claims. (Cl. 99—175)

In the Dutch Patent specification No. 62,435 a method is described for the production of sausage skins from crooked, inferior or too narrow casings. According to this specification the casings are first freed of fat and made porous, then stretched and cut open in the longitudinal direction, and the strips thus obtained are subsequently laid, while moist, about a wooden templet and stuck together near the overlapping edges by means of their own adhesive power, upon which the sausage skin thus produced is dried and removed from the templet.

The invention has for its object to furnish a method by which it is possible in a simple manner to produce sausage skins with a circumference which is greater than that of the original casings, but not twice as great, and for which it is further also possible to use casings that are too short, crooked, and/or inferior.

The method according to the invention for the production of sausage skins from casings that are too narrow, too short, crooked or inferior starts from casings that have been freed of fat and made porous, and is characterized in that a casing treated in this way is pulled over a preferably cylindrical templet, whose circumference is greater than that of the casing, a second casing is pulled over this, the casings are allowed to dry on the templet and the whole product thus obtained is then pushed off the templet.

The casing is made porous by a treatment with alkali or acid. By this treatment the casing will become not only porous, but also considerably more elastic. This property is used according to the invention to avoid the process of cutting the casing open. Owing to the adhesive power of the previously treated casings the two casing layers will adhere satisfactorily to each other after they have been dried.

If casings are used which are shorter than the templet, the procedure is such that more than one casing or part of a casing is pushed on to the templet and/or the first casing layer in such a way that these casings or parts of casings overlap slightly, preferably over a distance of 1–2 cm.

If crooked casings are used, it is preferable to push the casings over one another on the templet in such a way that their curvatures will face one another, i.e. that the short side of the second casing layer is diametrically opposite that of the first casing layer.

It is of course possible to combine the above measures if casings are used which possess a combination of these unfavourable properties, while the method according to the invention is particularly suitable for inferior casings, which cannot be used as sausage skins as a single layer.

When a templet is used which has been rounded spherically at one of the ends, it is possible to make sausage skins with a bag-shaped end by sticking both casing layers over this end.

A preferred procedure for making sausage skins with a bag-shaped end is as follows: A casing layer is pushed on to the templet, which layer may consist of several casings with overlapping ends. This casing layer is made in such a way that a part of the casing extends beyond the spherical end of the templet. This extending end is subsequently turned an odd number of times about its longitudinal axis, as a result of which a knot-shaped thickening is formed just outside the round end of the templet. The remaining extending end is then pushed back over the templet as the second casing layer. If the length of this end is insufficient to cover the whole of the templet, it is completed in the manner described above with one or more casings or parts of casings. The number of times the extending end is turned is chosen to be odd, because when crooked casings are used, the short sides of the two casing layers thus automatically come to rest diametrically opposite one another.

In this way a head of sufficient strength is obtained, while this method has the additional advantage that the sausage skin is produced in one operation, without separate adhesive seams having to be made at the round end of the templet.

What I claim is:

1. In a process for producing sausage skins having a closed end from adhesive casings freed of fat, by applying said casings on a cylindrical templet which is rounded spherically at one end, allowing said casings to dry on said templet, and pushing the product so obtained off the templet, the improvement which comprises the steps of: extending beyond said end of said templet a part of the casing which is applied near the spherically rounded end of said templet, turning said extending part of the casing an odd number of times about its longitudinal axis to form a knot-shaped thickening just outside the rounded end of the templet, and pulling back the remaining free end inside out over the casing layer on said templet, said knot-shaped thickening thereby imparting greater strength to said casing.

2. The process defined in claim 1 wherein inferior casings are used.

3. The sausage skin as obtained by the process of claim 1.

References Cited in the file of this patent

UNITED STATES PATENTS

| | | |
|---|---|---|
| 1,036,290 | May | Aug. 20, 1912 |
| 1,063,714 | May | June 3, 1913 |
| 1,699,076 | Mumm et al. | Jan. 15, 1929 |
| 1,837,280 | Mumm | Dec. 22, 1931 |

FOREIGN PATENTS

| | | |
|---|---|---|
| 62,435 | Netherlands | Feb. 15, 1949 |